United States Patent [19]

Iwashita et al.

[11] Patent Number: 5,522,931
[45] Date of Patent: Jun. 4, 1996

[54] COATING APPARATUS

[75] Inventors: Hironobu Iwashita; Takemasa Namiki; Shigetoshi Kawabe, all of Hino, Japan

[73] Assignee: Konica Corporation, Japan

[21] Appl. No.: 204,892

[22] Filed: Mar. 1, 1994

Related U.S. Application Data

[63] Continuation of Ser. No. 942,631, Sep. 9, 1992, abandoned.

[30] Foreign Application Priority Data

Oct. 11, 1991 [JP] Japan .................................. 3-263922

[51] Int. Cl.⁶ ...................................................... B05C 3/12
[52] U.S. Cl. ........................... 118/410; 118/419; 425/461; 425/467
[58] Field of Search .................................... 118/410, 419, 118/413; 425/461, 466, 467

[56] References Cited

U.S. PATENT DOCUMENTS

| | | | |
|---|---|---|---|
| 4,143,187 | 3/1979 | Pilgrim | 118/410 |
| 4,293,517 | 10/1981 | Knox | 425/461 |
| 4,411,614 | 10/1983 | Feathers | 425/461 |
| 4,708,629 | 11/1987 | Kasamatsu | 118/410 |
| 4,907,530 | 3/1990 | Shibata et al. | 118/410 |
| 5,136,972 | 8/1992 | Naka et al. | 118/411 |
| 5,234,330 | 8/1993 | Billow et al. | 425/461 |

*Primary Examiner*—Brenda A. Lamb
*Attorney, Agent, or Firm*—Jordan B. Bierman; Bierman and Muserlian

[57] ABSTRACT

An extrusion-type coating apparatus for performing a uniform coating on a web by equalizing a flow rate distribution of a coating material along the widthwise direction of the web. The apparatus has a slit in a coating head to pass the coating material from the bottom of the slit to an opening of the same opened on a surface portion of the coating head, a feeder to feed the web on the surface portion in a direction from a front edge to a rear edge of the opening of the slit and a restricting member to restrict a gap of the slit by an insertion of the restricting member into the slit. The restricting member has a thickness pattern along its length so as to equalize the flow rate of the coating material along the length of the slit.

3 Claims, 5 Drawing Sheets

FIG. 3-a
PRIOR ART
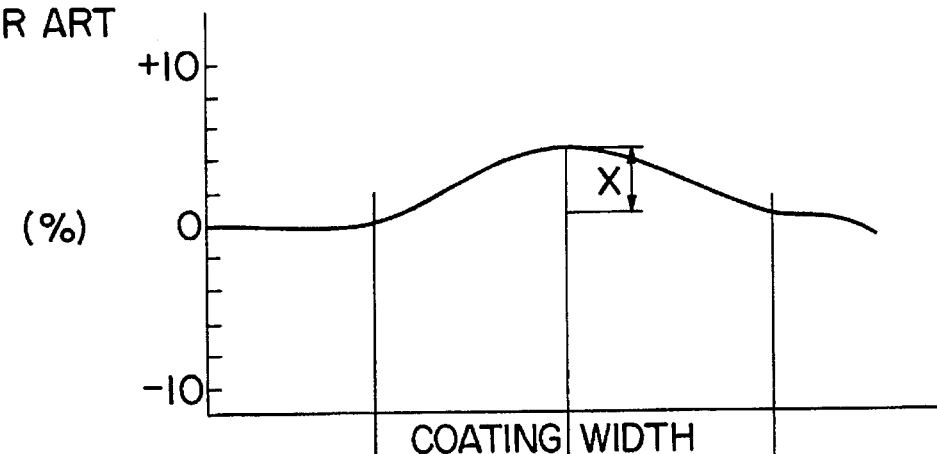
FIG. 3-b
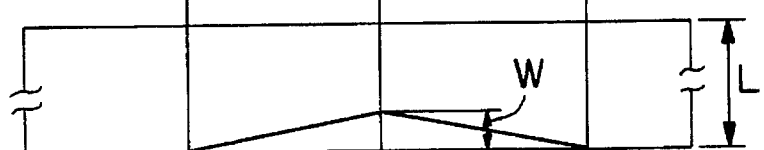
FIG. 3-c
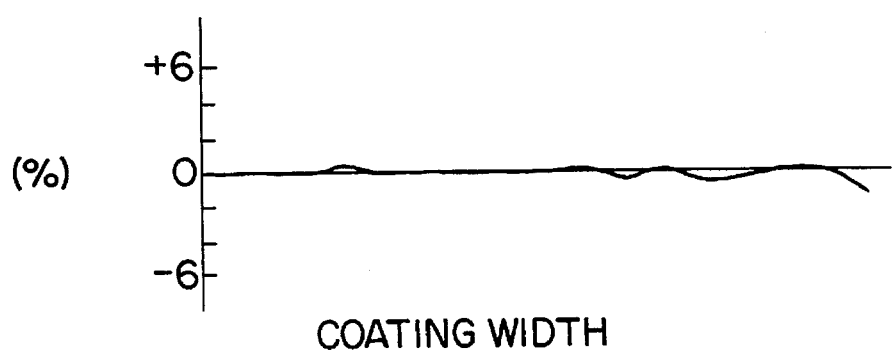

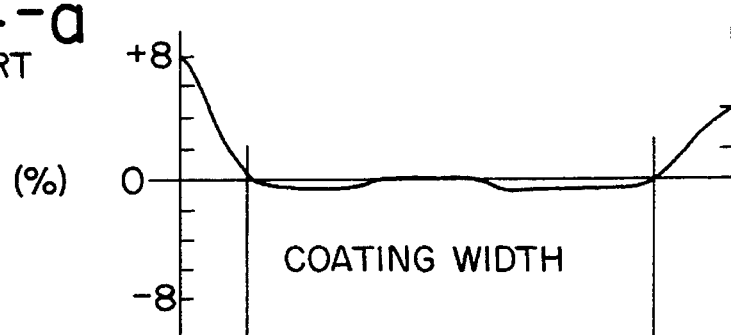
FIG. 4-a PRIOR ART
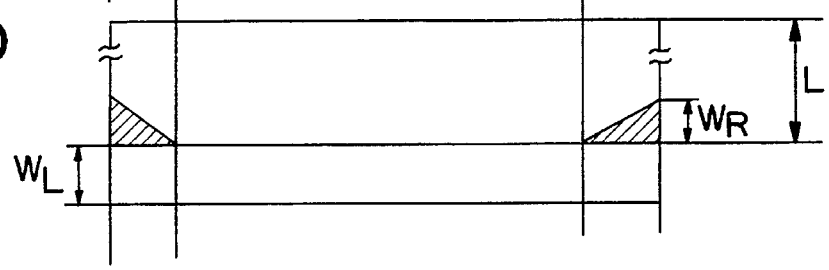
FIG. 4-b
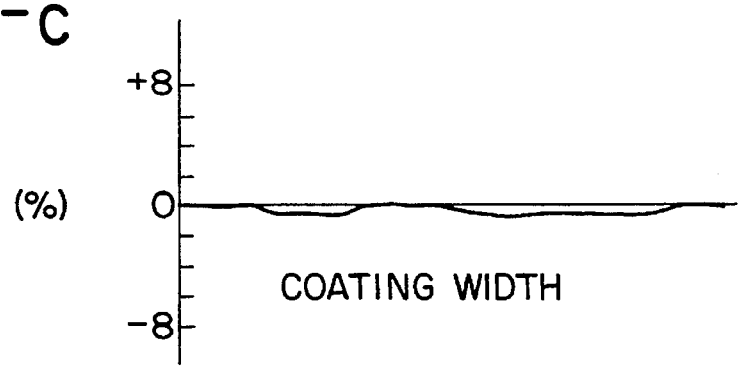
FIG. 4-c

COATING APPARATUS

This application is a continuation of application Ser. No. 07/942631, filed Sep. 9, 1992, now abandoned.

BACKGROUND OF THE INVENTION

The present invention relates to an extrusion type of coating apparatus, and more particularly relates to a coating apparatus which can prevent the occurrence of a thick layer so as to provide uniform layer thickness.

There are various kinds of coating, such as roller coating, gravure coating, slide bead coating, curtain coating, and extrusion coating. The most suitable type of coating apparatus is used for specific purpose. A magnetic recording medium is obtained when a magnetic coating solution is coated on a flexible support (referred to as a web). For the purpose of coating the magnetic coating solution, the extrusion type of coating apparatus is most suitable because a uniform coating layer can be obtained.

On the other hand, the magnetic recording medium has been rapidly improved recently, so that oxidized magnetic powder of high BET value and barium ferrite material are used, and the viscosity of a coating solution has been increased. Further, there is a great demand for coating a thin layer at high speed in order to improve productivity.

For example, methods for extrusion coating of a magnetic recording medium are disclosed in Japanese Patent Application Open to Public Inspection Nos. 84771/1982, 104666/1983 and 238179/1985. According to the aforementioned methods, a layer of uniform thickness can be obtained, however, the region which can be coated in good condition is relatively small. Therefore, under coating conditions of high viscosity, thin layer and high coating speed, it is difficult to obtain a coated layer of desired quality. That is, especially when the thickness of a coated layer is not more than 30 μm (wet layer thickness), a layer of uniform thickness can not be provided. The reason for uneven layer thickness is related to various factors such as the dimensional accuracy of a coater head, the configuration of an edge, the configuration of a liquid reservoir, the tension of a base, and the property of a coating solution. These factors are complicatedly related to each other.

At present, there is a strong demand for a coating apparatus which is not affected by these factors and can provide uniform layer thickness distribution.

BRIEF DESCRIPTION OF THE DRAWINGS

FIG. 3-a is a graph showing thickness distribution of a layer obtained by a conventional coating apparatus;

FIG. 3-b is a front view of a restricting member provided in a slit;

FIG. 3-c is a graph showing thickness distribution of a layer obtained by the coating apparatus of the present invention;

FIG. 4-a is a graph showing thickness distribution of a layer obtained by a conventional coating apparatus;

FIG. 4-b is a front view of a restricting member provided in a slit;

FIG. 4-c is a graph showing thickness distribution of a layer obtained by the coating apparatus of the present invention.

SUMMARY OF THE INVENTION

The present invention has been achieved to solve the aforementioned problems. It is a primary object of the present invention to provide an extrusion type of coating apparatus by which the occurrence of a thick layer can be prevented and uniform layer thickness distribution can be obtained.

The aforementioned object of the present invention can be achieved by an extrusion type of coating apparatus comprising: a front edge surface along which a continuously running flexible support is conveyed; a coating solution discharge port which discharges a coating solution so as to coat it on the flexible support; and a back edge surface along which the flexible support is conveyed, wherein a restricting member which is thinner than the slit, is disposed in the slit.

The thickness of of the restricting member disposed in the slit, is preferably 1 to 50% of the slit.

DETAILED DESCRIPTION OF THE INVENTION

The present invention will be specifically explained as follows.

Figure 1:
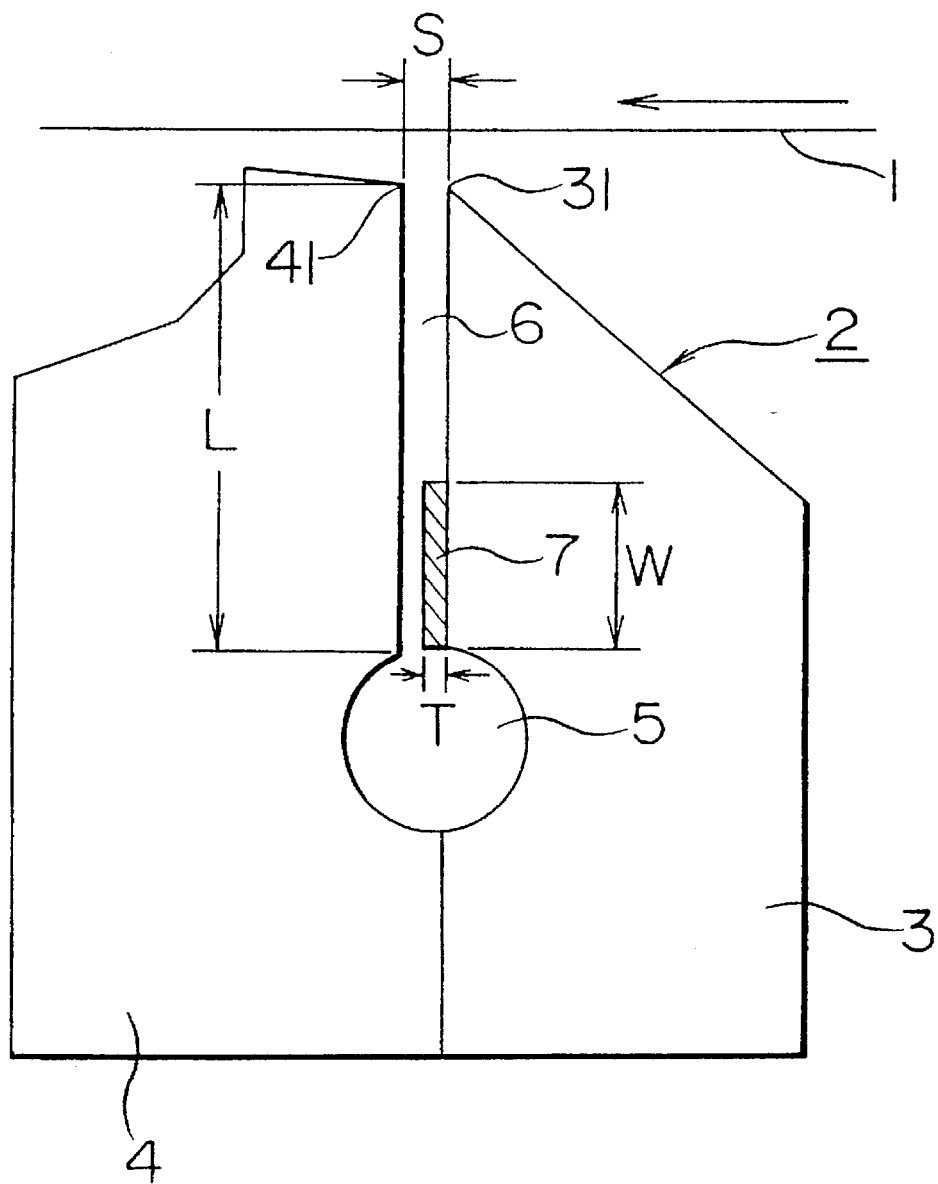
FIG. 1 is a sectional view of the coating apparatus of the present invention.

FIG. 1 is a sectional view of an extrusion type of coating apparatus having a restricting member of the present invention.

In FIG. 1, a web 1 running in an arrowed direction is coated by an extrusion type of coating apparatus 2. The coating apparatus 2 includes a front bar 3 and rear bar 4, wherein a coating solution reservoir 5 and a slit 6, which is a coating solution outlet, are provided therebetween in the coating apparatus 2. The coating solution which flows out from the slit 6 is coated on the web 1 which is conveyed along the surfaces of front and back edges 31 and 41. In the present invention, a restricting member 7 is provided in the slit.

This restricting member may be disposed either on the slit surface of the front bar or on the slit surface of the rear bar.

The restricting member must be provided at a lower portion within the slit, and must not extend up to either edge portion.

It is sufficient that the restricting member 7 has a predetermined width in the slit, and the restricting member may be protruded from the slit into the coating solution reservoir or onto a side surface of the coating device.

As described before, the restricting member 7 is disposed in the slit, and its width can be calculated by the following formula.

$$W=(S \times X \times X \times L)/(k \times X \times T \times 100)$$

where
W: width (mm) of the restricting member inside the slit
T: thickness (μm) of the restricting member inside the slit
S: width (μm) of the slit
L: length (mm) of the slit
X: fluctuation (%) of the layer thickness k: proportional coefficient ($2 \leq k \leq 6$) that is determined by experiment When the restricting member is provided in the slit, the occurrence of a thick layer can be prevented, and the thickness of a coated layer can be made uniform. Thickness T of the restricting member may be optionally determined within the range of 1 to 50% of the width of the slit.

Suppose that S (slit width), L (slit length) and K (proportional constant) are constant, and that it is required to correct X (fluctuation of layer thickness). Since W is in inverse proportion to T according to the above formula, W is reduced when T is increased.

For that reason, the values of T and W may be determined from the viewpoint of rigidity and machining accuracy of the members.

Figure 2:
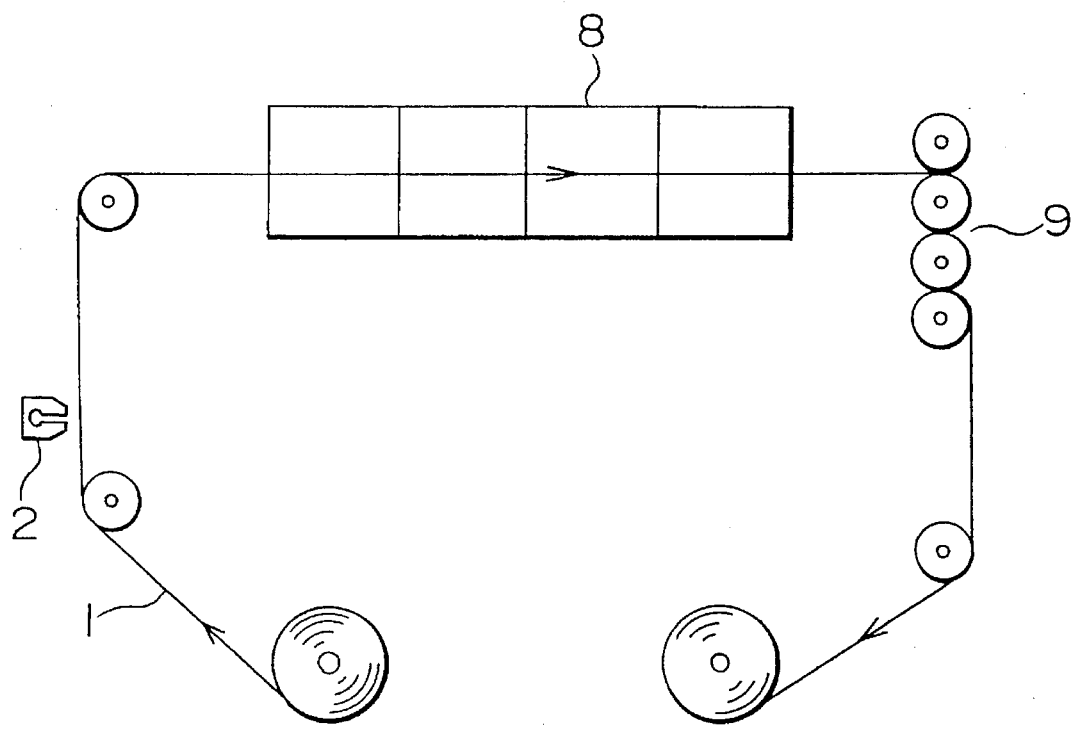
FIG. 2 is a schematic illustration of the structure of a coating and drying apparatus for a magnetic recording medium.

FIG. 2 is a schematic illustration showing the structure of a coating and drying apparatus for magnetic recording media.

In FIG. 2, a magnetic coating solution is coated on the support 1 by the coating apparatus 2 to make a magnetic recording medium. Then, the magnetic recording medium is dried by a drying apparatus 8, and calendered by a calender apparatus 9. After that, the magnetic recording medium is wound.

[EMBODIMENT 1]

The present invention will be specifically described as follows. However, it should be understood that the present invention is not limited to the specific embodiments. FIG. 3-a is a graph showing distribution of layer thickness in the case where the restricting member of the present invention is not provided.

In this case, experiments were carried out under the following conditions.

Coating solution: magnetic recording medium coating solution

Coating apparatus: extrusion type of coating apparatus

Coating speed: 300 m/min

Wet layer thickness: 15 μm

Slit width (S): 250 μm

Slit length (L): 40 mm

As shown in FIG. 3-a in which the layer thickness distribution is illustrated, the middle portion of the coated layer is thicker than other portions by 4% at the maximum.

The conditions of the restricting member were found according to the aforementioned formula.

In this case, the thickness of the restricting member in the slit was controlled in the following manner: the slit surface of the front bar was plated with chromium, the width of the plated portion of which was 2 mm, and the thickness was 100 μm; and the thickness (T) was reduced to 50 μm.

Due to the foregoing, the fluctuation of layer thickness distribution was reduced, and the middle portion was about 2% thicker than other portions.

Then, proportional coefficient K was found as follows.

$$K = (S \times X \times L)/(W \times T \times 100)$$
$$= (250 \times 2 \times 40)/(2 \times 50 \times 100) = 2$$

When proportional coefficient (K)≈2, and layer thickness fluctuation=4%, W≈(250×4×40)/(2×50×100) ≈4 (mm) According to the result of the calculation, the width of the restricting member in the slit was determined to be 4 min. FIG. 3-b is a front view of this restricting member.

FIG. 3-c shows the distribution of a coated layer which was obtained by a coating apparatus provided with the restricting member.

According to the result, the thickness of a coated layer was very uniform when the restricting member of the present invention was applied.

[EMBODIMENT 2]

FIG. 4-a is a graph showing distribution of layer thickness in the case where the restricting member of the present invention is not provided.

In this case, experiments were carried out under the following conditions.

Coating solution: magnetic recording medium coating solution

Coating apparatus: extrusion type of coating apparatus

Coating speed: 300 m/min

Wet layer thickness: 12 μm

Slit width (S): 250 μm

Slit length (L): 40 mm As shown in FIG. 4-a in which the layer thickness distribution is illustrated, both sides were thicker than the middle portion, that is, the left side is thicker by 8%, and the right side is thicker by 4%.

The conditions of the restricting member were found as follows according to the aforementioned formula.

In order to find a proportional coefficient, a metallic thin sheet used as a gauge, the width of which was 5 mm and the thickness of which was 50 μm, was positioned to the left side on the slit surface of the front bar. In order to fix the metallic thin sheet, its end was disposed outside and bent around the edge of the front bar, and pinched by the side plate. As a result, the fluctuation of the layer thickness distribution was reduced as compared with the case in which the restricting member was not provided. The reduced fluctuation was about 5%.

Then, proportional coefficient K was found as follows.

$$K = (S \times X \times L)/(W \times T \times 100)$$
$$= (250 \times 5 \times 40)/(5 \times 50 \times 100)$$

When proportional coefficient (K)≈2, and layer thickness fluctuation=8% (on the left side), $W_L$≈(250×8×40)/(2×50×100)≈8% (mm). In the case where the fluctuation on the right side is 4%, $W_R$≈4 (mm).

According to this result, the width of the restricting member of 50 μm thick was determined to be 8 mm on the left side and 4 mm on the right side. The configuration of the restricting member is shown in FIG. 4-b.

Figure 5:
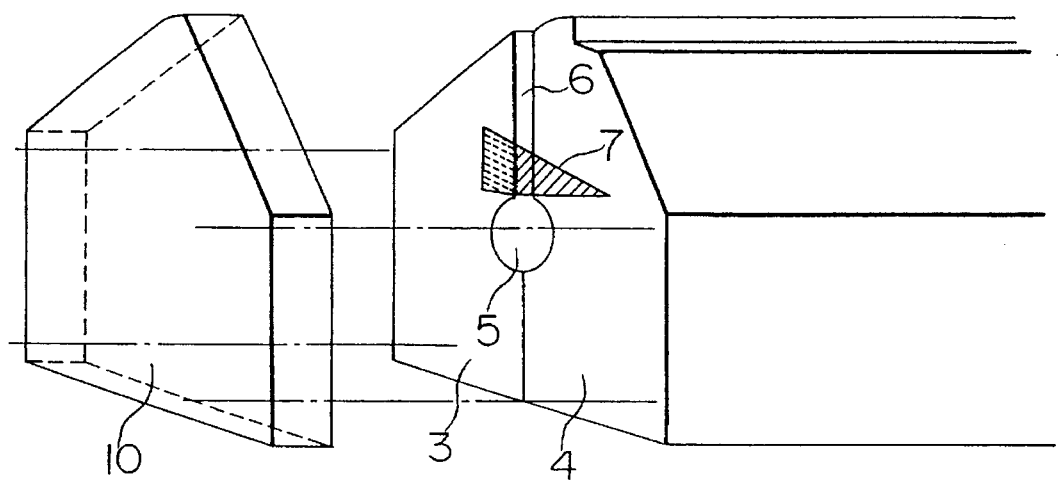
FIG. 5 is a perspective schematic illustration in the case where the restricting member is fixed.

FIG. 5 is a perspective schematic illustration in the case where the restricting member is inserted and fixed in the slit. As shown in the drawing, the restricting member 7 was inserted into the slit 6 the front bar 3 side. The end of the restricting member 7 was disposed outside of the slit and bent so that it was fixed. Then, the end portion of the restricting member 7 was pinched by the side plate 10. Then, packing or a sealing agent filled in the space between the die and the side plate so as to prevent the leakage of solution.

FIG. 4-c shows the distribution of a layer which was coated under the aforementioned conditions using a coating apparatus to which the restricting member was applied.

According to the result, it can be understood that the thickness of the coated layer was remarkably stabilized by the action of the restricting member of the present invention.

According to the present invention, an extrusion type of coating apparatus can be provided which can prevent the occurrence of a thick layer and obtain uniform layer thickness distribution.

What is claimed is:

1. An extrusion coating apparatus comprising:

a coating head having a slit portion in a longitudinal direction of said coating head, said slit portion forming an opening on a surface portion of said coating head, said opening being confined between a front edge and a rear edge of said surface portion, and constituting a slit width, wherein said coating head extrudes a coating material from the bottom of said slit portion so that said coating material flows out of said opening after flowing through a gap of said slit portion;

means for feeding a continuous web on said surface portion in a feeding direction from said front edge to said rear edge, said coating head applying said coating material along a coating width which is transverse to said feeding direction and parallel to said web, and a restricting member for restricting said slit width, said member having a width along a line perpendicular to said feeding direction and parallel to said longitudinal direction, and having a thickness along a line parallel to said feeding direction and perpendicular to said longitudinal direction, said thickness and said width structured to equalize distribution of said coating material along said coating width, wherein said width and said thickness satisfy the equation $$W=(S \times X \times L)/(k \times T \times 100)$$

wherein W is said width in millimeters, X is a corrected fluctuation of layer thickness in percent, L is a length of said slit in millimeters, k is a constant from 2 to 6, S is said slit width in micrometers, and T is said thickness in micrometers.

2. The apparatus of claim 1 wherein said restricting member is inserted into said slit from a side of said coating head, and an end of said restricting member is disposed outside said slit, bent, and thereby fixed by pinching a side plate.

3. The apparatus of claim 1 wherein said thickness of said restricting member is between 1% and 50% of said slit width.

* * * * *